A US006883015B1

(12) United States Patent
Geen et al.

(10) Patent No.: US 6,883,015 B1
(45) Date of Patent: Apr. 19, 2005

(54) APPARATUS AND METHOD FOR PROVIDING SERVER STATE AND ATTRIBUTE MANAGEMENT FOR MULTIPLE-THREADED VOICE ENABLED WEB APPLICATIONS

(75) Inventors: David William Geen, King George, VA (US); Geetha Ravishankar, Glen Allen, VA (US); Satish Joshi, Glen Allen, VA (US); Melissa L. Denbar, Richmond, VA (US); William Bateman Willaford, IV, Richmond, VA (US); Zhiwei Zhang, Richmond, VA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/538,899

(22) Filed: Mar. 30, 2000

(51) Int. Cl.[7] .............................................. G06F 15/16
(52) U.S. Cl. ........................ 709/203; 704/29; 704/217; 704/218; 704/228; 704/204; 704/224; 704/270.1; 707/10; 703/23
(58) Field of Search ............................... 704/270–277, 704/270.1; 709/203, 291, 217–218, 224, 228, 204; 707/10; 703/23

(56) References Cited

U.S. PATENT DOCUMENTS

| | | | |
|---|---|---|---|
| 4,837,798 A | | 6/1989 | Cohen et al. |
| 5,884,032 A | * | 3/1999 | Bateman et al. ............ 709/204 |
| 5,907,598 A | * | 5/1999 | Mandalia et al. ...... 379/100.01 |
| 6,052,367 A | * | 4/2000 | Bowater et al. ............ 370/352 |
| 6,098,093 A | * | 8/2000 | Bayeh et al. ................ 709/203 |
| 6,112,238 A | * | 8/2000 | Boyd et al. ................. 709/224 |
| 6,240,448 B1 | * | 5/2001 | Imielinski et al. .......... 709/218 |
| 6,269,336 B1 | * | 7/2001 | Ladd et al. ................. 704/270 |
| 6,278,966 B1 | * | 8/2001 | Howard et al. ............... 703/23 |
| 6,338,066 B1 | * | 1/2002 | Martin et al. ................ 707/10 |
| 6,490,564 B1 | * | 12/2002 | Dodrill et al. .............. 704/275 |
| 6,560,576 B1 | * | 5/2003 | Cohen et al. ............... 704/270 |
| 6,578,000 B1 | * | 6/2003 | Dodrill et al. .............. 704/270 |
| 6,711,618 B1 | * | 3/2004 | Danner et al. .............. 709/228 |

OTHER PUBLICATIONS

Bos, "XML in 10 Points", W3.org (Aug. 26, 1999).

* cited by examiner

Primary Examiner—Vijay Chawan
(74) Attorney, Agent, or Firm—Leon R. Turkevich

(57) ABSTRACT

An application server generates and maintains a server-side data record, also referred to as a "brownie", that includes application state information and user attribute information for multiple users within a single session controlled by a web-based browser. The brownie includes a session identifier that uniquely identifies the session, and a subsession identifier that uniquely identifies each corresponding user of the application session. As each new user is added to the session, for example by initiating a call to the new user, the application server stores the subsession identifier and corresponding application state information for the new user in the same brownie. In response to receiving a second web page request from the browser that includes the session identifier, the application server initiates a new web application instance, and recovers the brownie from the memory based on the session identifier included in the second page request.

52 Claims, 5 Drawing Sheets

```
<sml version = "1.0" >                    ─104
<state    sesid = "12345" >
    <subsession    value= "1">
        <item    name: "IMAP_Uid"    value = "user1"/>
        <item    name: "IMAP_PW"     value = "pass1"/>
        <item    name: "IMAP_Uid"    value =
                                     "reach_sub_menu.xml"/>
        <item    name: "Line"        value = "(703) 555-1212"
    </subsession>
    <subsession>   value= "2" >
        <item    name: "IMAP_Uid"    value = "user2"/>
        <item    name: "IMAP_PW"     value = "abxy"/>
        <item    name: "IMAP_Uid"    value = "connect_rq.xml"/>
        <item    name: "Line"        value = "(703) 555-1234"
    </subsession>
    .
    .
    .
</state>
</xml>
```

(labels: 106a, 108a, 110a, 112a, 114a, 106b, 108b, 110b, 112b, 114b, 102)

FIG. 3

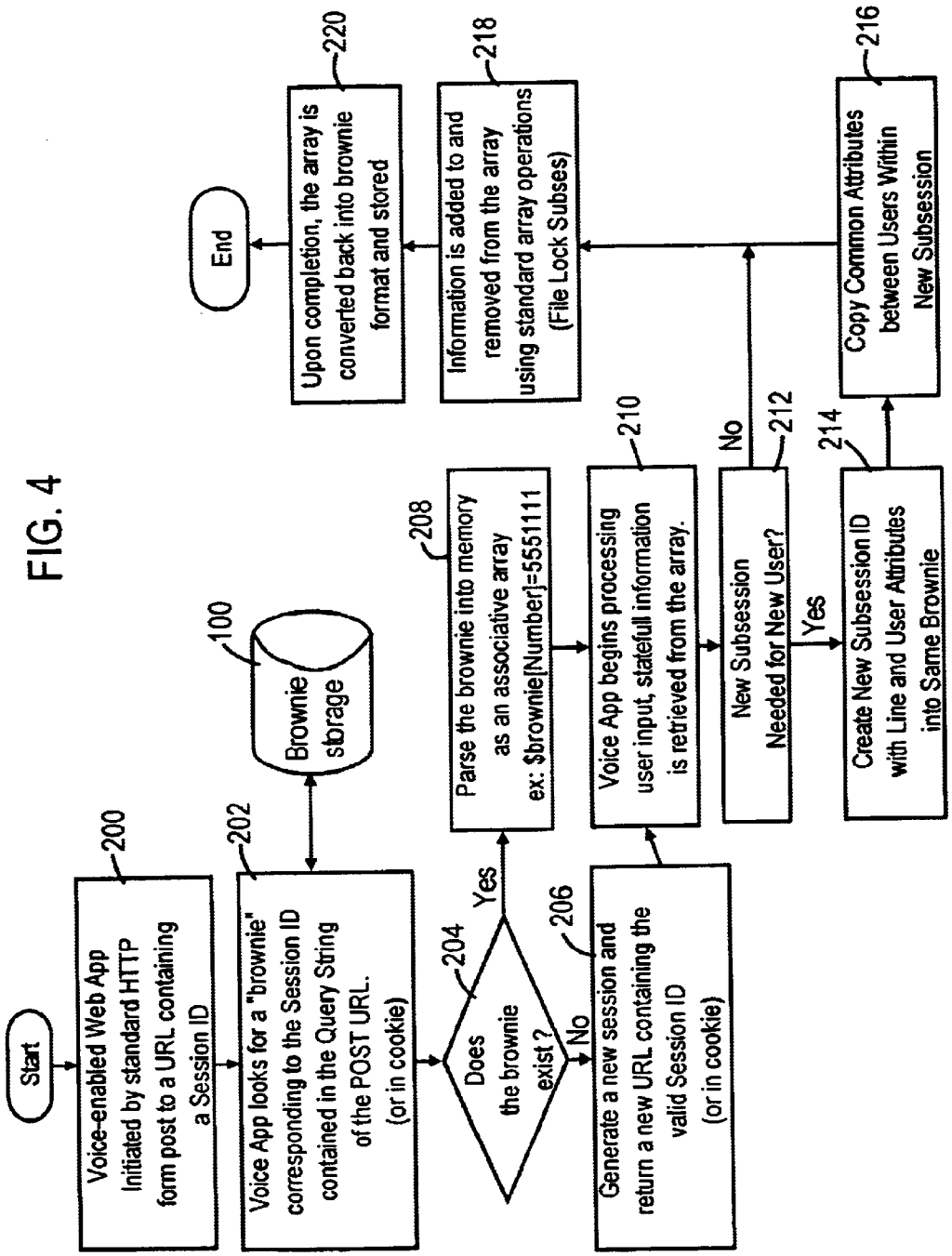

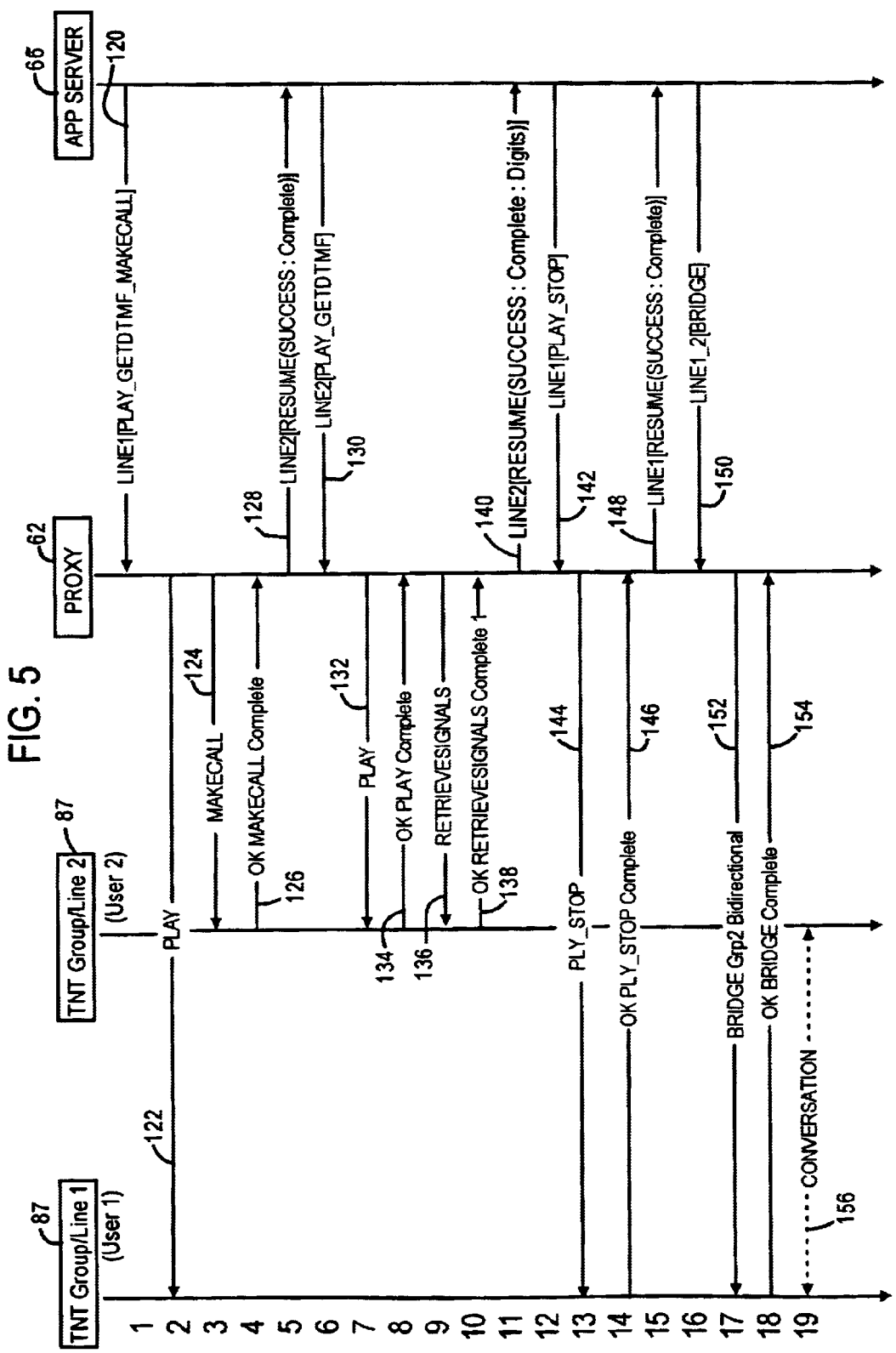

APPARATUS AND METHOD FOR PROVIDING SERVER STATE AND ATTRIBUTE MANAGEMENT FOR MULTIPLE-THREADED VOICE ENABLED WEB APPLICATIONS

BACKGROUND OF THE INVENTION

1. Field of the Invention

The present invention relates to web browser-enabled control of audio operations for voice enabled web applications within a hypertext markup language (HTML) and hypertext transport protocol (HTTP) framework.

2. Description of the Related Art

The evolution of the public switched telephone network has resulted in a variety of voice applications and services that can be provided to individual subscribers and business subscribers. Such services include voice messaging systems that enable landline or wireless subscribers to record, playback, and forward voice mail messages. However, the ability to provide enhanced services to subscribers of the public switched telephone network is directly affected by the limitations of the public switched telephone network. In particular, the public switched telephone network operates according to a protocol that is specifically designed for the transport of voice signals; hence any modifications necessary to provide enhanced services can only be done by switch vendors that have sufficient know-how of the existing public switched telephone network infrastructure.

An open standards-based Internet protocol (IP) network, such as the World Wide Web, the Internet, or a corporate intranet, provides client-server type application services for clients by enabling the clients to request application services from remote servers using standardized protocols, for example hypertext transport protocol (HTTP). The web server application environment can include web server software, such as Apache, implemented on a computer system attached to the IP network. Web-based applications are composed of HTML pages, logic, and database functions. In addition, the web server may provide logging and monitoring capabilities.

In contrast to the public switched telephone network, the open standards-based IP network has enabled the proliferation of web based applications written by web application developers using ever increasing web development tools. Hence, the ever increasing popularity of web applications and web development tools provides substantial resources for application developers to develop robust web applications in a relatively short time and an economical manner. However, one important distinction between telephony-based applications and web-based applications is that telephony-based applications are state aware, whereas web-based applications are stateless.

In particular, telephony applications are state aware to ensure that prescribed operations between the telephony application servers and the user telephony devices occur in a prescribed sequence. For example, operations such as call processing operations, voicemail operations, call forwarding, etc., require that specific actions occur in a specific sequence to enable the multiple components of the public switched telephone network to complete the prescribed operations.

The web-based applications running in the IP network, however, are state-less and transient in nature, and do not maintain application state because application state requires an interactive communication between the browser and back-end database servers accessed by the browsers via a HTTP-based web server. However, an HTTP server provides asynchronous execution of HTML applications, where the web applications in response to reception of a specific request in the form of a URL from a client, instantiate a program configured for execution of the specific request, send an HTML web page back to the client, and terminate the program instance that executed the specific request. Storage of application state information in the form of a "cookie" is not practical because some users prefer not to enable cookies on their browser, and because the passing of a large amount of state information as would normally be required for voice-type applications between the browser and the web application would substantially reduce the bandwidth available for the client.

Commonly-assigned, copending application Ser. No. 09/461,191, filed Dec. 15, 1999, entitled Apparatus and Method for Providing Server State and Attribute Management for Voice Enabled Web Applications, the disclosure of which is incorporated in its entirety herein by reference, discloses an application server that executes a voice-enabled web application by runtime execution of extensible markup language (XML) documents that define the voice-enabled web application to be executed. The application server includes a runtime environment that establishes an efficient, high-speed connection to a web server. The application server, in response to receiving a user request from a user, accesses a selected XML page that defines at least a part of the voice application to be executed for the user. The XML page may describe any one of a user interface such as dynamic generation of a menu of options or a prompt for a password, an application logic operation, or a function capability such as generating a function call to an external resource. The application server then parses the XML page, and executes the operation described by the XML page, for example dynamically generating an HTML page having voice application control content, or fetching another XML page to continue application processing. In addition, the application server accesses an XML page, referred to also as a "brownie", that stores application state information, enabling the application server to be state-aware relative to the user interaction. Hence, the XML page, which can be written using a conventional editor or word processor, defines the application to be executed by the application server within the runtime environment, enabling voice enabled web applications to be generated and executed without the necessity of programming language environments.

Hence, use of the above-described "brownie" enables the application server to be state-aware relative to the user interaction, providing the user with the perception of a real-time interactive message retrieval session such as a voice mail session.

However, more complex telephony type services involve call control for multiple simultaneous call sessions such as conference bridging, or single number reach applications where a calling party attempts to reach a voice mail subscriber. In particular, a single number reach application provides a calling party an option to either leave a message, or wait while the single number reach application attempts to contact the subscriber at different telephone numbers (e.g., work, cellphone, home, etc.); assuming the single number reach application is able to locate the subscriber, the single number reach application plays an announcement identifying the calling party, allowing the subscriber to either connect with the calling party or send the calling party to the subscriber's voice mailbox. Hence, deployment of a single number reach application requires an architecture that enables call control for multiple simultaneous call sessions.

SUMMARY OF THE INVENTION

There is a need for an arrangement that enables voice applications involving control of multiple simultaneous call sessions to be implemented on an IP packet switched network using the open standards-based flexibility of the IP network.

There is also a need for an arrangement that enables unified voice messaging services to be provided via an IP network to a web browser, where state and attribute information may be maintained for multiple users during a unified interactive message service session, where each user within the unified interactive message service session has a corresponding independent application state.

These and other needs are attained by the present invention, where an application server configured for executing voice-enabled web applications for a web browser generates and maintains a server-side data record configured for storing application state information and user attribute information for multiple users within a unified application session. The application server, in response to receiving a new web page request from a browser of a first user, upon verifying that a new session with the first user is required, creates a transient application session and executes a web application instance to complete the request, and generates the server-side data record including application state information for the application session and user attribute information for the first user of the application session. The server-side data record also includes a session identifier that uniquely identifies the session and may include, for example, a subsession identifier that uniquely identifies the application state (e.g., first thread) for the first user of the application session. The application server stores the server-side data record in a memory resident within the server side of the network, and sends to the browser the session identifier and the corresponding web page requested by the web browser. In response to receiving a second web page request from the browser that includes the session identifier, the application server executes a new web application instance, and recovers the server-side data record from the memory based on the session identifier included in the second page request.

If the application server determines that a new (second) thread needs to be initiated for a second user based on a request from the first user of the application session, the application server stores application state information associated with the second thread and user attribute information for the second user within the same server-side data record as the first user. Hence, the application server can independently control the first and second threads for the respective users, enabling bridging of the two users followed by separation and continued independent operations by each of the two users.

According to one aspect of the present invention, a method is provided in a server configured for executing web-based voice application operations. The method includes receiving a first hypertext markup language (HTML) request, via a hypertext transport (HTTP) connection, for execution of a first web-based voice application operation for a first user. A session identifier is first stored in a data record, plus a first application state that specifies an execution by a first application instance of the first web-based voice application operation for the first user. The method also includes executing a second web-based voice application operation by a second application instance for a second user based on the execution of the first web-based voice application operation for the first user, and storing in the data record a second application state that specifies the execution by the second application instance of the second web-based voice application operation for the second user. Storage of the data record in the server enables the server to provide the appearance of a state-full session for the users, even when there is no continuity between the existence of the application instances. Moreover, maintaining application state information for multiple users within the same data record enables the server to coordinate voice application operations between the users, for example by bridging the users together, while maintaining the ability to provide independent voice application operations for the respective users as desired. Hence, the server can be used to execute voice application operations where users can be bridged, and where individual users can perform one-way voice application operations even during the bridging (for example is a user is placed on hold by another user) or after the bridge is disconnected.

Another aspect of the present invention provides a processor-based system configured for executing web-based voice application operations. The system includes a hypertext transport protocol (HTTP) interface and an application server. The HTTP interface is configured for receiving first and second hypertext markup language (HTML) requests by first and second users, respectively, and sending via an HTTP connection first and second HTML pages having a same session identifier and first and second subsession identifiers to browser instances serving the first and second users, respectively. The application server is configured for executing first and second web application instances for generation of the first and second HTML pages in response to the first and second HTML requests, respectively, the application server storing a data record that specifies a session state, a first subsession state for the first user based on execution of the first web application instance, and a second subsession state for the second user upon completion of the second web application instance, the application server accessing the data record in response to detecting the session identifier in a subsequent HTML request from one of the first and second users, and executing a selected web application operation based on at least one of the first and second subsession states in the accessed data record.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

Figure 2:
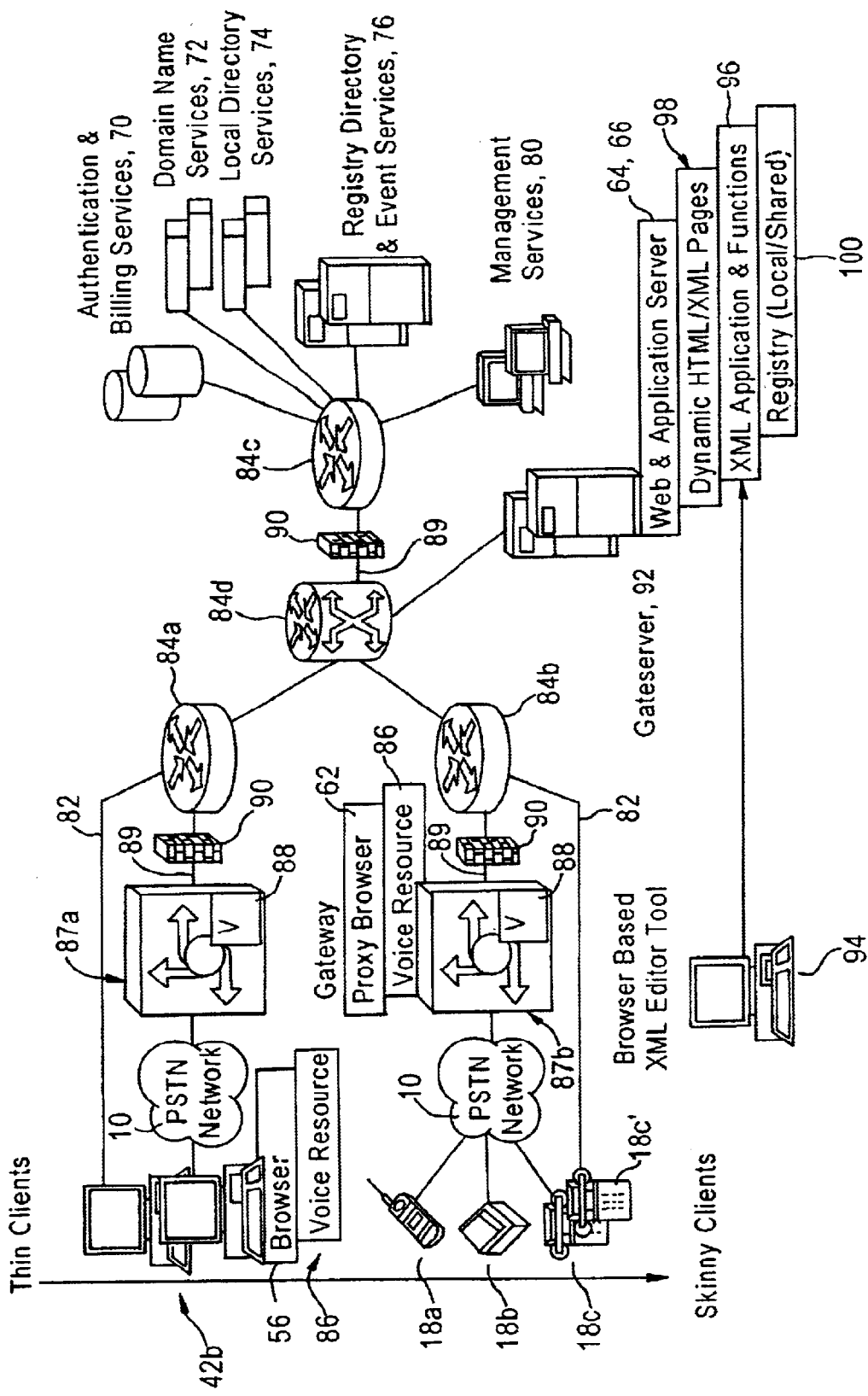
FIG. 2 is a diagram illustrating in further detail implementation of voice applications on the IP network of FIG. 3 including the application server for generating a data record according to an embodiment of the present invention.

FIG. 3 is a diagram illustrating a data record generated and stored by the application server of FIG. 2 for preservation of application state and attributes for multiple users during a single session according to an embodiment of the present invention.

FIG. 4 is a flow diagram illustrating a method of generating a data record for preservation of application state for voice enabled web applications according to an embodiment of the present invention.

Figure 1:
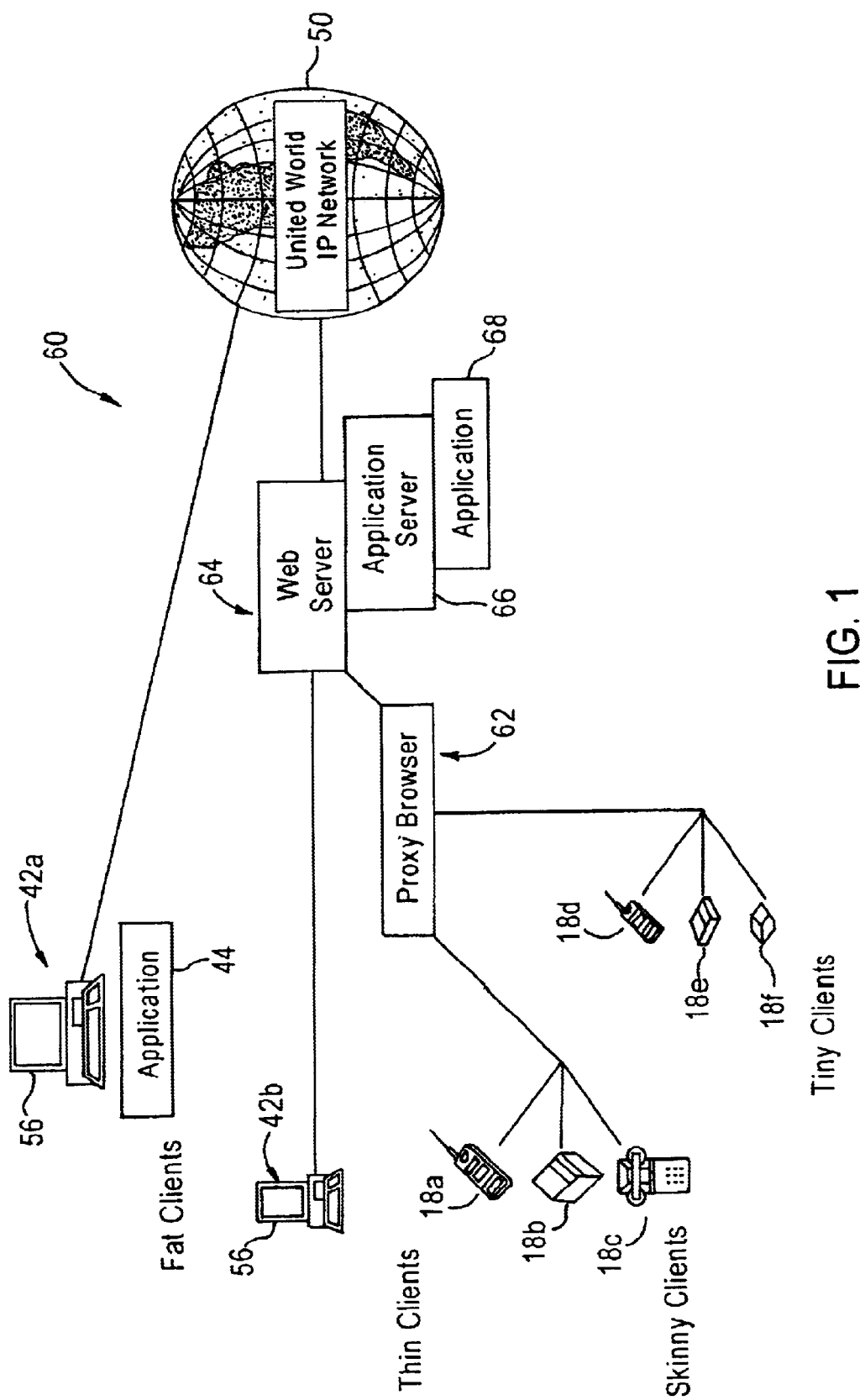
FIG. 1 is a block diagram illustrating a paradigm that enables multiple-threaded voice messaging services and data services to be provided via an IP network using browser audio control according to an embodiment of the present invention.

FIG. 5 is a call processing diagram illustrating HTML-based commands transferred between the application server and the proxy browser of FIGS. 1 and 2 for execution of a multiple-user voice application session according to an embodiment of the present invention.

BEST MODE FOR CARRYING OUT THE INVENTION

FIG. 1 is a block diagram illustrating an architecture that provides unified voice messaging services and data services via an IP network using browser audio control according to an embodiment of the present invention, reproduced from FIG. 3 of the above-incorporated application Ser. No. 09/461,191. The clients 42a and 42b, referred to herein as "fat clients" and "thin clients", respectively, have the distinct advantage that they can initiate requests using IP protocol to any connected web server 64 to execute part or most of the applications 44 on behalf of the clients. An example of a fat client 42a is an e-mail application on a PC that knows how to run the application 44 and knows how to run the IP protocols to communicate directly with the messaging server via the packet switched network 50. An example of a thin client 42b is a PC that has a web browser; in this case, the web browser 56 can use IP protocols such as HTTP to receive and display web pages generated according to hypertext markup language (HTML) from server locations based on uniform resource locators (URLs) input by the user of the PC.

As shown in FIG. 1, each of the clients (tiny clients, skinny clients, thin clients and fat clients) are able to communicate via a single, unified architecture 60 that enables voice communications services between different clients, regardless of whether the client actually has browser capabilities. Hence, the fat client 42a and the thin client 42b are able to execute voice enabled web applications without any hardware modification or any modification to the actual browser; rather, the browsers 56 in the clients 42a and 42b merely are provided with an executable voice resource configured for providing browser audio control, described below.

The user devices 18a, 18b, and 18c, illustrated as a cordless telephone 18a, a fax machine18b having an attached telephone, and an analog telephone 18c, are referred to herein as "skinny clients", defined as devices that are able to interface with a user to provide voice and/or data services (e.g., via a modem) but cannot perform any control of the associated access subnetwork.

The wireless user devices 18d, 18e, and 18f, illustrated as a cellular telephone (e.g., AMPS, TDMA, or CDMA) 18d, a handheld computing device (e.g., a 3-Com Palm Computing or Windows CE-based handheld device) 18e, and a pager 18f, are referred to as tiny clients. "Tiny clients" are distinguishable from skinny clients in that the tiny clients tend to have even less functionality in providing input and output interaction with a user, rely exclusively on the executable application in an access subnetwork to initiate communications; in addition, tiny clients may not be able to send or receive audio signals such as voice signals at all.

Hence, the skinny clients 18a, 18b, and 18c and the tiny clients 18d, 18e, and 18f access the unified voice messaging services in the unified network 60 via a proxy browser 62, configured for providing an IP and HTTP interface for the skinny clients and the tiny clients. In particular, browsers operate by interpreting tags within a web page supplied via an HTTP connection, and presenting to a user media content information (e.g., text, graphics, streaming video, sound, etc.) based on the browser capabilities; if a browser is unable to interpret a tag, for example because the browser does not have the appropriate executable plug-in resource, then the browser typically will ignore the unknown tag. Hence, the proxy browser 62 can provide to each of the skinny clients and tiny clients the appropriate media content based on the capabilities of the corresponding client, such that the cordless telephone 18a and telephone 18c would receive analog audio signals played by the proxy browser 62 and no text information (unless a display is available); the fax machine 18b and pager 18f would only receive data/text information, and the cellular telephone 18d and the handheld computing device 18e would receive both voice and data information. Hence, the proxy browser 62 interfaces between the IP network and the respective local access devices for the skinny clients and the tiny clients to provide access to the unified messaging network 60.

The proxy browser 62 and the web browsers 56 within the fat client 42a and the thin client 42b execute voice enabled web applications by sending data and requests to a web server 64, and receiving hypertext markup language (HTML) web pages from the web server 64, according to hypertext transport protocol (HTTP). The web server 64 serves as an interface between the browsers and an application server 66 that provides an executable runtime environment for XML voice applications 68. For example, the web server 64 may access the application server 66 across a common Gateway Interface (CGI), by issuing a function call across an application programming interface (API), or by requesting a published XML document or an audio file requested by one of the browsers 56 or 62. The application server 66, in response to receiving a request from the web server 64, may either supply the requested information in the form of an HTML page having XML tags for audio control by a voice resource within the browser, or may perform processing and return a calculated value to enable the browser 56 or 62 to perform additional processing.

The application server 66 accesses selected stored XML application pages (i.e., pages that define an application) and in response generate new XML pages during runtime and supply the generated XML pages to the web server 64. Since multiple transactions may need to occur between the browser 56 or 62 and the application server 66, the application server 66 is configured for storing for each existing user session a data record, referred to as a "brownie", that identifies the state of the existing user session; hence, the application server 66 can instantiate a procedure, return the necessary data, and terminate the procedure without the necessity of maintaining the instance running throughout the entire user session. Additional details regarding the brownie are described below.

FIG. 2 is a diagram that illustrates in further detail the network 60 of FIG. 1. As shown in FIG. 2, the arrangement of providing browser audio control for voice enabled web applications enables voice application services to be implemented in a web server paradigm for many different telephony services, including authentication and billing services 70, domain name services 72, local directory services 74, registry directory and event services 76, and management services 78.

FIG. 2 also illustrates in further detail the browser and web application server interaction. In particular, the thin clients 42b (and fat clients 42a) may be configured for accessing the web server 64 via a direct IP connection 82 to a router 84. The thin client 42b can directly access the web server 64 for voice enabled web application services if the thin client 42b has a browser 56 and an executable voice resource 86, for example an executable XML aware plug-in resource, or a Java applet embedded within a received HTML page. Alternatively, the thin client 42b may access the web server 64 via the public switched telephone network 10, where an IP gateway 87a includes a voice over IP interface 88 that sends information to the server 64 using an HTTP connection 89 via a firewall 90.

Since the skinny clients and tiny clients 18 do not have browser resources, the skinny clients and tiny clients 18 access the proxy browser 62 via the PSTN 10 and the IP gateway 87b. The IP gateway 87b includes both a proxy browser 62 and a voice resource 86, enabling the IP gateway 87 to provide all audio control service for the skinny clients and tiny clients 18. Hence, the PSTN 10 is used merely for transfer of analog audio signals, with intelligent application processing being provided by the proxy browser 62. Note that if one of the telephones 18c' is an IP telephone, then it can access the server 64 via an IP connection 82; in this case, the browser internal to the IP telephone 18c' would process only audio functions, and would ignore any tags associated with text or image content.

As shown in FIG. 2, the web server 64, the application server 66, and the voice web applications 68 reside within a gateserver 92. The gateserver 92 includes a browser based XML editor tool 94 that enables a web programmer to design voice applications using XML pages. The XML pages are stored as XML applications and functions 96, for example within a database accessible by the application server 66. The XML pages stored within the XML application and functions 96 may be stored as static pages to be fetched by the web server 64 and supplied to a browser, however the XML pages may also define the actual application to be executed by the application server 66 in runtime. Hence, the application server 66 may execute stored XML applications and functions 96, and in response generate dynamic HTML having XML tags, also referred to as HTML/XML pages.

According to the disclosed embodiment, the browsers 56 and 62 provide audio control for voice enabled web applications based on the HTML-XML pages supplied by the application server 66 to the web server 64 for transport across an HTTP connection. The application server 66 executes stored XML applications, also referred to generally as a web applications, in response to HTML requests from the user. During execution of the stored XML applications, the application server 66 stores in a registry 100 a data record, also referred to as a "brownie", that specifies the application state for at least one XML application instance. As described below with respect to FIG. 3, the "brownie" is configured for storing user attribute information and application state information for multiple users associated with a given voice applications session. Hence, the application server 66 may simultaneously and independently control voice application operations for multiple users that may be associated according to a prescribed application condition, for example the possibility of bridging the users together for a phone call or a phone conference.

Hence, the use of a "brownie" configured for storing attributes and state information for multiple users enables the application server to effectively control multiple "lines" for the proxy browser 62 controlling, for example, a voice over IP telephony switch.

FIG. 3 is a diagram illustrating a brownie 102 configured for specifying application state and attribute information for multiple users according to an embodiment of the present invention. As shown in FIG. 3, the brownie 102 is implemented as an XML document that includes XML tags that specify the application state and user attribute information. The application server 66 generates an XML tag 104 that specifies a session identifier ("sesid") for an application session involving multiple users. The application server 66 also generates XML tags 106 that specify a unique subsession for each user. In particular, the application server 66 generates for each subsession 106 XML tags 108, 110, and 114 that specify attributes for the user. These tags are data fields as retrieved by an application instance and stored in the brownie in order to maintain persistence. For example, the XML tag 108 identifies the user identifier as "user1", where the value "user1" specifies a unique user ID. The unique user ID in tag 108 may be used as the login to an IMAP mailbox, an ID for a pager, and the like. The XML tag 110 specifies a password state for the corresponding user; for example the XML tag 110 may specify the password to be entered by the user, or alternately the XML tag 110 may specify that the user has already been authenticated during a previous interaction during the same user session specified in the corresponding subsession identifier 106. The application server 66 also generates an XML tag 114 that specifies the logical address used by the voice resource, for example the voice over IP gateway 87, to connect with the user via a corresponding client device 18.

The application server 66 also generates an XML tag 112 that specifies the application state with the user. For example, the state "reach_sub_menu.xm1" specifies that the last page executed by the application server 66 for the corresponding user "user1" under subsession ID "1" was the XML application page "reach_sub menu.xm1". Hence, the application server 66, upon determining that the prior application state was "reach_sub_menu.xm1", may be able to determine the next subsequent page that needs to be generated for the user session based on the user input. For example, if the user input was a value of "2", the application server 66 would be able to interpret the input as selection "2" from a previously supplied main menu; hence, the application server 66 could execute the XML application that corresponds to selection "2" from the menu of the user subsession, providing the perception to the user of a statefull interactive voice application.

FIG. 4 is a diagram illustrating the method of executing web application instances using a data record to store application state information according to an embodiment of the present invention. The steps described in FIG. 4 can be implemented as computer code that is stored on a computer readable medium (e.g., a hard disk drive, a floppy drive, a random access memory, a read only memory, an EPROM, a compact disk, etc). The method begins in step 200 by the application server 66 initiating execution of the first web application instance in response to receiving an HTML request from a browser, for example the proxy browser 62 serving multiple sessions for the voice over IP gateway 87. Specifically, the web application instance is initiated by the application server 66 in response to reception of a standard HTTP form post to a URL containing a session identifier. Alternately, a new session may be initiated upon detection of a standard HTTP form post to a default URL.

In response to detecting the session identifier in the HTML request, the application server 66 in step 202 searches for a brownie 102 in the storage registry 100 that corresponds to the session identifier contained in the query string of the post URL; alternatively, the session identifier may be specified in a cookie supplied by the browser 62 along with the HTTP request (e.g., the standard HTTP form post to the default URL). If in step 204 the application server 66 determines that the brownie does not exist for the supplied session identifier, the application server 66 generates a new session in step 206 and returns a new URL containing the valid session identifier (alternately, the new session ID may be supplied in a cookie to the browser). However if in step 204 the application server 66 determines that a brownie 102 exists for the corresponding session identifier 104, the application server 66 in step 208 parses the brownie 102 into an internal memory as an associative array.

The application server 66 then begins execution in step 210 of a selected web application instance based on the user input and the application state 108 supplied in the corresponding brownie 102. The application server 66 then determines in step 212 whether a new subsession 106 is needed for a new user, for example a second user that a first user is attempting to reach. Assuming a new subsession 106 needs to be generated within the brownie 102, the application server 66 creates a new subsession identifier (e.g., 106*b*), and adds the line attribute 114 and the user attributes (e.g., 108,110, and 112) in step 214. Any common attributes between users specified within the same brownie 102 are also copied into the new subsession 106 in step 216.

The application server 66 selectively adds and removes state information from the associative array, used to temporarily store state and user attribute information, during the execution of the web application instance in step 218. In addition, the application server 66 uses file locking mechanisms to ensure that does not improperly delete application state information for one of the users within the brownie 102. Upon completion of the execution of the web application instance in step 220, the application server 66 converts the information stored in the associative array back into a brownie format 102, stores the brownie back into the registry 100, and terminates the executed web application instance.

Hence, the application server 66 is able to maintain state information for multiple users within a single shared session, giving the appearance to each corresponding user of a single, interactive application, when in fact the application server 66 actually executes separate web application instances for each user request, using the data record 102 to maintain application state and user attribute information. Hence, the application server 66 can provide the appearance of an interactive voice response system that provides intelligent decisions based on the user profile and based on the current position of the user within a menu structure. Moreover, the storage of information for multiple subsessions for respective within the same brownie 102 enables the application server 66 to selectively bridge and separate different users within the same overall session as specified by the session identifier 104.

Consider the example of a single-number reach application, illustrated in FIG. 5, where the first user "user1" dials into the voice over IP gateway 87 in an attempt to reach the second user "user2". Instead of simply forwarding the first user into the voice mail system of the second user, the application server 66 executes the XML document "reach_sub_menu.xm1" to generate for the first user in step 120 an HTML page (PLAY_GETDTMF_MAKECALL) including XML tags that enable the proxy browser 62 to play in step 122 a prompt to the first user for a single number reach application, indicating that the application server 66 will attempt to reach the second user unless the first user presses a key to leave a voice mail message. The HTML page (PLAY_GETDTMF_MAKECALL) is also used by the proxy browser in step 124 to send a command (MAKECALL) to the voice over IP gateway 87 to initiate a new telephone call to the second user. The HTML page typically will include an XML tag specifying input mask, enabling the proxy browser 62 to expect a response from the voice over IP gateway 87 indicating whether the call is complete to the second user.

Upon receiving in step 126 a response that the call to the second user is complete, the proxy browser 62 posts data in step 128 to a prescribed URL (RESUME(SUCCESS: Complete)) indicating that the call to the second user on the second line (e.g., (703) 555–1234) is complete. The application server 66 than executes an XML document (e.g., "connect_rq.xm1") to dynamically generate in step 130 an HTML page (PLAY_GETDTMF) having XML tags specifying media content for prompting the second user whether to connect with the first user. At this time, the application server 66 also generates the subsession data 106*b* for the second user, illustrated in FIG. 3. The proxy browser 62, in response to receiving the HTML page (PLAY_GETDTMF), plays the .wav file specified by the XML tags in the HTML page in step 132 and coordinates with the voice over IP gateway 87 to collect the prompt digits from the second user in steps 134, 136, and 138. The proxy browser 62 then posts the digits collected from the second user in step 140 to the application server 66. In response to receiving the digits (SUCCESS: Complete: Digits), the application server 66 selectively executes an XML document based on the supplied digits and the user attributes specified in the brownie 102 to initiate a bridging operation.

The structure of the brownie 102 in distinct subsessions 106 enables the application server 66 to independently control interactions between the first user and the second user. For example, the prompt played by the proxy browser 62 in step 122 may allow the first user to perform optional voice messaging operations (e.g., access the first user's voice mailbox, stock quotes, etc.) while the application server 66 attempts to reach the second user. Hence, the first user may perform independent voice application operations with the application server 66 while the application server 66 attempt to reach the second user, as opposed to simply waiting on hold. Once the application server 66 detects in step 140 that a bridging operation should be performed, the application server 66 updates the subsessions 106*a* and 106*b* accordingly, and generates in step 142 an HTML page (PLAY_STOP) that specifies halting any interactive operations by the proxy browser 62 and the voice over IP gateway 87 in steps 144 and 146. If desired, the halted operation may be stored in the first user's brownie portion 106*a* comma enabling the first user to continue after the bridge.

Upon receiving in step 148 confirmation that the first user is ready for the bridge, the application server 66 generates an HTML document (BRIDGE) having XML tags that specify to the proxy browser 62 to the voice over IP gateway 87 should bridge the first user and the second user in steps 152,154, and 156.

According to the disclosed embodiment, application state for multiple users is contained within a single XML document as each user is added to the application session, for example when the voice application makes an outbound phone call. Since the brownie is a structured XML document, the application server can easily copy the original state information into the new subsession, along with knowledge about the original subsession identifier. Hence, each user can be controlled independently throughout the common session, enabling each user a corresponding set of voice application operations even while in a bridged state, such that one user may press a key that is detected by the proxy browser but is inaudible to other users. Alternately, the independent control of respective users by the application server enables the application server to selectively grant different voice application operations to different bridge to users, such that only selected users may be able to terminate the bridge or add another user to the bridge.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a server configured for executing web-based voice application operations, the method comprising:
   receiving a first hypertext markup language (HTML) request, via a hypertext transport (HTTP) connection, for execution of a first web-based voice application operation for a first user;
   first storing in a data record a session identifier and a first application state that specifies an execution by a first application instance of the first web-based voice application operation for the first user;
   executing a second web-based voice application operation by a second application instance for a second user based on the execution of the first web-based voice application operation for the first user; and
   second storing in the data record a second application state that specifies the execution by the second application instance of the second web-based voice application operation for the second user.

2. The method of claim 1, wherein the first storing step and the second storing step each include storing user attribute information that specifies attributes about the corresponding user in the data record.

3. The method of claim 1, further comprising:
   executing a third web-based voice application operation in response to reception of a second HTML request from a first browser serving the first user and based on the first application state stored in the data record; and
   overwriting the first application state stored in the data record with a third application state that specifies the execution of the third web-based voice application operation for the first user.

4. The method of claim 3, wherein the step of executing the third web-based voice application operation includes outputting for the first user an HTML page having extensible markup language (XML) tags that specify a group of menu options selectable by the first user and at least one media file to be played for the first user.

5. The method of claim 3, wherein the step of executing the third web-based voice application operation includes:
   initiating a third application instance in response to reception of the second HTML request;
   accessing by the third application instance the data record based on detecting the session identifier within the second HTML request; and
   selecting for execution a stored XML document that specifies the third web-based voice application operation, based on identifying the HTML request by the first user and based on the first application state stored in the data record.

6. The method of claim 3, further comprising:
   receiving via the HTTP connection a third HTML request from a second browser serving the second user;
   executing a selected fourth web-based voice application operation in response to the third HTML request and based on the second application state stored in the data record; and
   selectively storing in the data record fourth and fifth application states for the first and second users, respectively, based on execution of the selected fourth web-based voice application operation.

7. The method of claim 6, wherein the step of executing the selected fourth web-based voice application operation includes sending XML tags specifying a bridge command to at least one of the first and second browsers for bridging the first and second users based on detection of a prescribed command within the third HTML request, the selectively storing step including specifying within the data record the fourth and fifth application states based on sending the bridge command.

8. The method of claim 6, wherein the step of executing the selected fourth web-based voice application operation includes outputting to the first user a second HTML page having XML tags that specify a record operation for recording a message, the selectively storing step including specifying as the fourth application state a leave-message operation, and specifying as the fifth application state an unavailability of the second user.

9. The method of claim 1, further comprising generating the data record as an XML document configured for storing a plurality of application states for respective users according to the session identifier, the first storing step including storing a first subsession identifier for the first user, and storing a second subsession identifier for the second user.

10. The method of claim 9, further comprising selectively executing respective web-based voice application operations independently for the first and second users based on respective HTML requests received from the first and second users and the first and second application state stored in the data record.

11. The method of claim 10, wherein the selectively executing step includes executing a selected voice application operation for requesting bridging of the first and second users based on a prescribed HTML request received from the second user, the method further comprising third storing in the data record a third application state for the first and second users specifying the bridging.

12. The method of claim 11, wherein the selectively executing step further includes executing a second selected voice application operation for requesting disconnection of the bridging based on a second prescribed HTML request received from an HTML browser serving one of the first and second users and the stored third application state, the method further comprising fourth storing in the data record a fourth application state for the first and second users specifying the disconnection of the bridging.

13. The method of claim 12, further comprising selectively executing a second group of respective web-based voice application operations independently for the first and second users based on respective HTML requests received from the first and second users and the fourth application state stored for the first and second users in the data record.

14. The method of claim 1, further comprising controlling write access to the data record by one of the first and second application instances based on prescribed read/write protocol within the server.

15. The method of claim 1, further comprising:
terminating the first application instance based on completion of the first web-based voice application operation by the first application instance; and
terminating the second application instance based on completion of the second web-based voice application operation by the second application instance.

16. A computer readable medium having stored thereon sequences of instructions for executing web-based voice application operations by a server, the sequences of instructions including instructions for performing the steps of:
receiving a first hypertext markup language (HTML) request, via a hypertext transport (HTTP) connection, for execution of a first web-based voice application operation for a first user;
first storing in a data record a session identifier and a first application state that specifies an execution by a first application instance of the first web-based voice application operation for the first user;
executing a second web-based voice application operation by a second application instance for a second user based on the execution of the first web-based voice application operation for the first user; and
second storing in the data record a second application state that specifies the execution by the second application instance of the second web-based voice application operation for the second user.

17. The medium of claim 16, wherein the first storing step and the second storing step each include storing user attribute information that specifies attributes about the corresponding user in the data record.

18. The medium of claim 16, further comprising instructions for performing the steps of:
executing a third web-based voice application operation in response to reception of a second HTML request from a first browser serving the first user and based on the first application state stored in the data record; and
overwriting the first application state stored in the data record with a third application state that specifies the execution of the third web-based voice application operation for the first user.

19. The medium of claim 18, wherein the step of executing the third web-based voice application operation includes outputting for the first user an HTML page having extensible markup language (XML) tags that specify a group of menu options selectable by the first user and at least one media file to be played for the first user.

20. The medium of claim 18, wherein the step of executing the third web-based voice application operation includes:
initiating a third application instance in response to reception of the second HTML request;
accessing by the third application instance the data record based on detecting the session identifier within the second HTML request; and
selecting for execution a stored XML document that specifies the third web-based voice application operation, based on identifying the HTML request by the first user and based on the first application state stored in the data record.

21. The medium of claim 18, further comprising instructions for performing the steps of:
receiving via the HTTP connection a third HTML request from a second browser serving the second user;
executing a selected fourth web-based voice application operation in response to the third HTML request and based on the second application state stored in the data record; and
selectively storing in the data record fourth and fifth application states for the first and second users, respectively, based on execution of the selected fourth web-based voice application operation.

22. The medium of claim 21, wherein the step of executing the selected fourth web-based voice application operation includes sending XML tags specifying a bridge command to at least one of the first and second browsers for bridging the first and second users based on detection of a prescribed command within the third HTML request, the selectively storing step including specifying within the data record the fourth and fifth application states based on sending the bridge command.

23. The medium of claim 21, wherein the step of executing the selected fourth web-based voice application operation includes outputting to the first user a second HTML page having XML tags that specify a record operation for recording a message, the selectively storing step including specifying as the fourth application state a leave-message operation, and specifying as the fifth application state an unavailability of the second user.

24. The medium of claim 16, further comprising instructions for performing the step of generating the data record as an XML document configured for storing a plurality of application states for respective users according to the session identifier, the first storing step including storing a first subsession identifier for the first user, and storing a second subsession identifier for the second user.

25. The medium of claim 24, further comprising instructions for performing the step of selectively executing respective web-based voice application operations independently for the first and second users based on respective HTML requests received from the first and second users and the first and second application state stored in the data record.

26. The medium of claim 25, wherein the selectively executing step includes executing a selected voice application operation for requesting bridging of the first and second users based on a prescribed HTML request received from the second user, the method further comprising third storing in the data record a third application state for the first and second users specifying the bridging.

27. The medium of claim 26, wherein the selectively executing step further includes executing a second selected voice application operation for requesting disconnection of the bridging based on a second prescribed HTML request received from an HTML browser serving one of the first and second users and the stored third application state, the method further comprising fourth storing in the data record a fourth application state for the first and second users specifying the disconnection of the bridging.

28. The medium of claim 27, further comprising instructions for performing the step of selectively executing a second group of respective web-based voice application operations independently for the first and second users based on respective HTML requests received from the first and second users and the fourth application state stored for the first and second users in the data record.

29. The medium of claim 16, further comprising instructions for performing the step of controlling write access to the data record by one of the first and second application instances based on prescribed read/write protocol within the server.

30. The medium of claim 16, further comprising instructions for performing the steps of:
  terminating the first application instance based on completion of the first web-based voice application operation by the first application instance; and
  terminating the second application instance based on completion of the second web-based voice application operation by the second application instance.

31. A processor-based system configured for executing web applications, the system comprising:
  a hypertext transport protocol (HTTP) interface configured for receiving first and second hypertext markup language (HTML) requests by first and second users, respectively, and sending via an HTTP connection first and second HTML pages having a same session identifier and first and second subsession identifiers to browser instances serving the first and second users, respectively; and
  an application server configured for executing first and second web application instances for generation of the first and second HTML pages in response to the first and second HTML requests, respectively, the application server storing a data record that specifies a session state, a first subsession state for the first user based on execution of the first web application instance, and a second subsession state for the second user upon completion of the second web application instance, the application server accessing the data record in response to detecting the session identifier in a subsequent HTML request from one of the first and second users, and executing a selected web application operation based on at least one of the first and second subsession states in the accessed data record.

32. The system of claim 31, wherein the HTTP interface includes a web server connected to an Internet Protocol (IP) network.

33. The system of claim 31, further including a local memory for storing the data record for a prescribed time interval.

34. The system of claim 31, further comprising a shared registry for storing the data record, the shared registry configured for supplying the data record to authorized servers.

35. The system of claim 31, wherein the application server is configured for storing within the data record attribute information that specifies respective attributes about the first and second users, the application server executing the selected web application operation based on the user attribute information in the corresponding accessed data record.

36. The system of claim 35, wherein the application server stores the data record as an extensible markup language (XML) document.

37. The system of claim 31, wherein the application server further is configured for:
  terminating the first application instance based on completion of the first web-based voice application operation by the first application instance; and
  terminating the second application instance based on completion of the second web-based voice application operation by the second application instance.

38. A system configured for executing web-based voice application operations, the system comprising:
  first means for receiving a first hypertext markup language (HTML) request, via a hypertext transport (HTTP) connection, for execution of a first web-based voice application operation for a first user; and
  second means for:
    (1) first storing in a data record a session identifier and a first application state that specifies an execution by a first application instance of the first web-based voice application operation for the first user,
    (2) executing a second web-based voice application operation by a second application instance for a second user based on the execution of the first web-based voice application operation for the first user, and
    (3) second storing in the data record a second application state that specifies the execution by the second application instance of the, second web-based voice application operation for the second user.

39. The system of claim 38, wherein the second means is configured for storing user attribute information in the data record that specifies attributes about each corresponding user in the data record.

40. The system of claim 38, wherein the second means is further configured for:
  executing a third web-based voice application operation in response to reception of a second HTML request from a first browser serving the first user and based on the first application state stored in the data record; and
  overwriting the first application state stored in the data record with a third application state that specifies the execution of the third web-based voice application operation for the first user.

41. The system of claim 40, wherein the second means is configured for executing the third web-based voice application operation based on outputting for the first user an HTML page having extensible markup language (XML) tags that specify a group of menu options selectable by the first user and at least one media file to be played for the first user.

42. The system of claim 40, wherein the second means is configured for executing the third web-based voice application operation based on:
  initiating a third application instance in response to reception of the second HTML request;
  accessing by the third application instance the data record based on detecting the session identifier within the second HTML request; and
  selecting for execution a stored XML document that specifies the third web-based voice application operation, based on identifying the HTML request by the first user and based on the first application state stored in the data record.

43. The system of claim 40, wherein:
  the first means is configured for receiving via the HTTP connection a third HTML request from a second browser serving the second user;
  the second means is configured for executing a selected fourth web-based voice application operation in response to the third HTML request and based on the second application state stored in the data record, the second means selectively storing in the data record fourth and fifth application states for the first and second users, respectively, based on execution of the selected fourth web-based voice application operation.

44. The system of claim 43, wherein the second means is configured for executing the selected fourth web-based voice application operation based on sending XML tags specifying a bridge command to at least one of the first and second browsers for bridging the first and second users based on detection of a prescribed command within the third HTML request, the second means configured for specifying within the data record the fourth and fifth application states based on sending the bridge command.

45. The system of claim 43, wherein the second means is configured for executing the selected fourth web-based voice application operation based on outputting to the first user a second HTML page having XML tags that specify a record operation for recording a message, the second means configured for specifying as the fourth application state a leave-message operation, and specifying as the fifth application state an unavailability of the second user.

46. The system of claim 38, wherein the second means is configured for generating the data record as an XML document configured for storing a plurality of application states for respective users according to the session identifier, the first storing step including storing a first subsession identifier for the first user, and storing a second subsession identifier for the second user.

47. The system of claim 46, wherein the second means is configured for selectively executing respective web-based voice application operations independently for the first and second users based on respective HTML requests received from the first and second users and the first and second application state stored in the data record.

48. The system of claim 47, wherein the second means is configured for executing a selected voice application operation for requesting bridging of the first and second users based on a prescribed HTML request received from the second user, the method further comprising third storing in the data record a third application state for the first and second users specifying the bridging.

49. The system of claim 48, wherein the second means is configured for executing a second selected voice application operation for requesting disconnection of the bridging based on a second prescribed HTML request received from an HTML browser serving one of the first and second users and the stored third application state, the second means configured for storing in the data record a fourth application state for the first and second users specifying the disconnection of the bridging.

50. The system of claim 49, wherein the second means is configured for selectively executing a second group of respective web-based voice application operations independently for the first and second users based on respective HTML requests received from the first and second users and the fourth application state stored for the first and second users in the data record.

51. The system of claim 38, wherein the second means is configured for controlling write access to the data record by one of the first and second application instances based on a prescribed read/write protocol.

52. The system of claim 38, wherein the second means is configured for:
   terminating the first application instance based on completion of the first web-based voice application operation by the first application instance; and
   terminating the second application instance based on completion of the second web-based voice application operation by the second application instance.

* * * * *

UNITED STATES PATENT AND TRADEMARK OFFICE
CERTIFICATE OF CORRECTION

PATENT NO. : 6,883,015 B1
DATED : April 19, 2005
INVENTOR(S) : Geen et al.

It is certified that error appears in the above-identified patent and that said Letters Patent is hereby corrected as shown below:

Column 16,
Line 12, please delete "," between "the" and "second"

Signed and Sealed this

Seventh Day of June, 2005

JON W. DUDAS
*Director of the United States Patent and Trademark Office*